United States Patent [19]

Handman et al.

[11] Patent Number: 5,696,409

[45] Date of Patent: Dec. 9, 1997

[54] APPARATUS FOR SUPPLYING POWER TO THE SEAT OF A VEHICLE

[75] Inventors: Daniel F. Handman, Petaluma, Calif.; John B. Sparhawk, Royal Oak; Russell E. Hamann, Rochester Hills, both of Mich.

[73] Assignee: TRW Vehicle Safety Systems Inc., Lyndhurst, Ohio

[21] Appl. No.: 708,408

[22] Filed: Sep. 4, 1996

[51] Int. Cl.[6] .................................................. H01F 27/00
[52] U.S. Cl. .................................. 307/10.1; 307/104
[58] Field of Search ............................ 307/104, 17, 9.1, 307/10.1; 455/41; 336/DIG. 2; 364/423.098, 424.045, 424.059; 439/950; 340/854.8

[56] References Cited

U.S. PATENT DOCUMENTS 3,522,509  8/1970  Hasenbalg ..................... 336/DIG. 2
4,038,625  7/1977  Tompkins et al. ............. 336/DIG. 2
4,888,535  12/1989  Brusasco ........................... 307/10.1
5,385,476  1/1995  Jasper ............................ 336/DIG. 2

*Primary Examiner*—Richard T. Elms
*Attorney, Agent, or Firm*—Tarolli, Sundheim, Covell, Tummino & Szabo

[57] ABSTRACT

An apparatus (10) provides electrical power between a seat-mounted appliance (14) in a vehicle and a source of electrical energy in the vehicle without the use of electrical connectors. A vehicle seat (28) is mounted in a vehicle (26). A transformer (12) for transmitting electrical energy to the electrical appliance (14) includes a first portion (18) mounted to the vehicle (26) and a second portion (20) mounted to the vehicle seat (28). The second portion (20) is electrically connected to the electrical appliance (14). A drive circuit (32) for energizing the transformer (12) is electrically connected to the first portion (18) and has an oscillator. Preferably, the first portion (18) of the transformer (12) comprises a primary winding and the second portion (20) of the transformer (12) comprises a secondary winding.

9 Claims, 2 Drawing Sheets

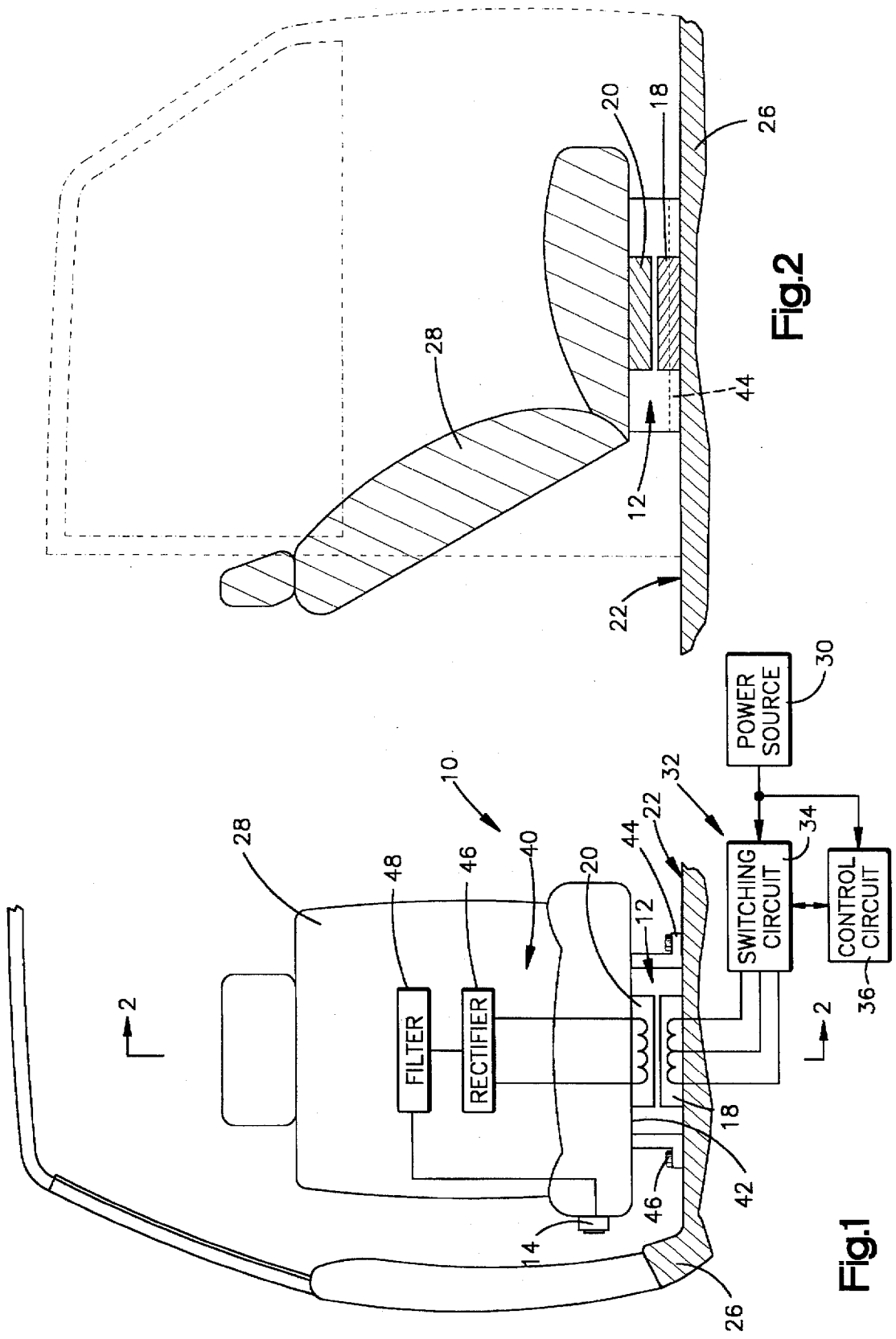

APPARATUS FOR SUPPLYING POWER TO THE SEAT OF A VEHICLE

FIELD OF THE INVENTION

The present invention is directed to an apparatus for supplying power to the seat of a vehicle, and is particularly directed to an apparatus for supplying power to electrical appliances in the seat of a vehicle.

BACKGROUND OF THE INVENTION

Many of today's vehicles have electrical appliances mounted on or in a seat of the vehicle. Examples of such electrical appliances include an electric seat adjustment mechanism, an electric seat belt retractor, a seat belt indicator light, a courtesy light, and a seat heater. Accordingly, it is necessary to provide electric power to the vehicle seat so that an electrical appliance mounted on or in the seat can operate.

Typically, electrical power from the vehicle's electrical system is used to power the electrical appliances mounted in or on the vehicle seat. It is known in the art to connect the vehicle's electrical system to the electrical seat appliances through plug-in connectors. Certain vehicle seats, such as van seats, are removable from the vehicle. The plug-in connection makes removal and replacement of the vehicle seat somewhat cumbersome since the electrical connection must be manually disconnected for seat removal and reconnected for seat installation in the vehicle.

An apparatus which provides electrical power to the seat appliances upon installation of the seat in the vehicle, without a plug-in connection, is desirable.

SUMMARY OF THE INVENTION

An apparatus provides electrical power between a seat-mounted appliance in a vehicle and a source of electrical energy in the vehicle without the use of plug-in electrical connectors. In accordance with the present invention, the apparatus comprises a vehicle seat mounted in a vehicle and transformer means for providing electrical energy to an electrical appliance on the vehicle seat. The transformer means includes a first portion mounted to the vehicle and a second portion mounted to the vehicle seat. The second portion is electrically connected to the electrical appliance. Means are provided for energizing the transformer means.

In accordance with a preferred embodiment of the invention, the first portion of the transformer means comprises a primary winding and the second portion of the transformer means comprises a secondary winding. A drive circuit electrically connected to the primary winding and having an oscillator drives the primary winding. A rectifying and filter circuit electrically connects the secondary winding to the electrical appliance.

BRIEF DESCRIPTION OF THE DRAWINGS

The foregoing and other features and advantages of the present invention will become apparent to one skilled in the art to which the present invention relates upon consideration of the following detailed description of the invention with reference to the accompanying drawings, wherein:

FIG. 1 is a schematic diagram of an apparatus in accordance with the present invention;

FIG. 2 is a schematic sectional view, taken along line 2—2 of FIG. 1; and

DESCRIPTION OF PREFERRED EMBODIMENTS

Figure 3:
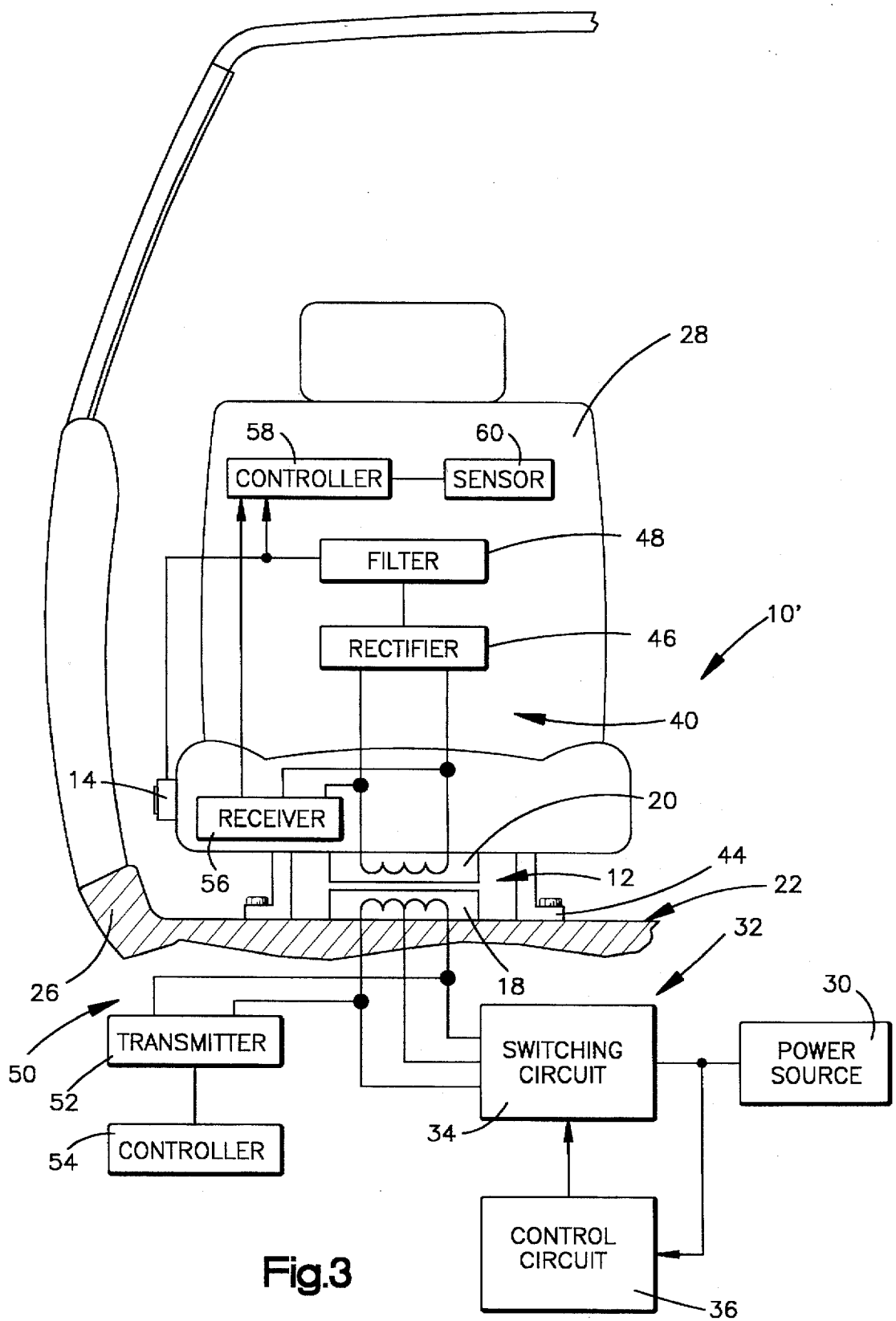
FIG. 3 is a schematic diagram similar to FIG. 1 showing an alternate embodiment of the present invention.

Referring to FIG. 1, an apparatus 10 for supplying power to an electrical appliance mounted on or in a vehicle seat 28, such as a seat courtesy light 14, includes a transformer 12. Other electric appliances which could be located in the vehicle seat 28 and powered by the apparatus 10 include, but are not limited to, an electric seat belt retractor, a seat belt indicator light, and a seat heater.

The transformer 12 includes a primary winding 18 and a secondary winding 20. The primary winding 18 is mounted to a vehicle body 26. The primary winding 18 extends upward from the floor 22 of the vehicle body 26 at a location where the vehicle seat 28 is mounted. As shown in FIG. 1, the seat 28 is securable to the floor 22 of the vehicle body 26 through the use of brackets 44 and bolts 46. Alternatively, the vehicle seat 28 could be secured to the vehicle floor 22 by other removable mounting means which are known in the art, such as interlocking latch mechanisms and tongue-in-groove connections.

The primary winding 18 is operatively coupled to a source of electrical energy 30, such as the vehicle battery, through a drive circuit 32. The drive circuit 32 includes a switching circuit 34 and control circuit 36. The drive circuit 32 further includes an oscillator which converts the vehicle's DC battery voltage into an AC electrical signal to drive the primary winding 18.

The secondary winding 20 is mounted to the vehicle seat 28. The secondary winding 20 extends downward from the bottom surface 42 of the vehicle seat 28, as shown in FIG. 2. The secondary winding 20 is attached to the frame (not shown) of the seat 28 such that sliding adjustment of the seat cushion relative to the frame does not affect the position of the secondary winding 28.

The secondary winding 20 is electrically connected to a rectifying circuit 40 which is mounted in the vehicle seat 28. The rectifying circuit 40, which includes a rectifier 46 and filter 48, converts the AC signal from the secondary winding 20 into a DC signal used to power the electrical appliance 14. The rectifying circuit 40 is further electrically connected to the electrical appliance 14.

When the vehicle seat 28 is installed in the vehicle, the primary winding 18 and the secondary winding 20 are positioned to form an inductive coupling which comprises the transformer 12. Preferably, when the seat 28 is installed in the vehicle, the axis of the primary winding 18 is positioned approximately 0.5 inches from the axis of the secondary winding 20. With the vehicle seat 28 installed, whenever the vehicle's electrical system is activated (i.e., the ignition is turned on), the apparatus 10 automatically provides electrical power for the appliance 14 in the vehicle seat 28 from the vehicle's electrical system.

The oscillator in the drive circuit 32 converts a DC voltage from the vehicle's electrical system into an AC electrical signal and sends the AC signal to the primary winding 18. Upon receiving the AC signal, the primary winding 18 creates a magnetic field. The magnetic field crosses the gap between the primary and secondary windings 18, 20 and induces an AC signal in the secondary winding 20. Thus, electrical energy is transmitted to the vehicle seat 28 without having to connect electrical wires between the vehicle body 26 and the vehicle seat 28.

The AC signal induced in the secondary winding 20 passes through the rectifying circuit 40 and is converted into a DC signal. The DC signal is used to power the electrical appliance 14 in the vehicle seat 28.

If the vehicle seat 28 is removed from the vehicle body 26, electrical power to the appliance 14 in the seat 28 is automatically terminated without having to disconnect an electrical connection manually. As the secondary winding 20 is no longer in proximity to the primary winding, any magnetic field created by the primary winding 18 will go unreceived.

Alternatively, the control circuit 36 of the drive circuit 32 can include appropriate sensing circuitry to enable sensing of the presence of the secondary winding 20. If the vehicle seat 28 is secured to the vehicle body 26 in a predetermined location over the primary winding 18, the secondary winding 20 will be sensed as being present, and the drive circuit 32 will be enabled to energize the primary winding 18. The sensing circuitry in the drive circuit 32 can disable the primary winding 18 from being energized by the drive circuit 32 when the secondary winding 20 is removed from the primary winding 18.

Referring now to FIG. 3, an apparatus 10' provides electric power to a seat-mounted appliance 14 as described above with regard to FIG. 1. In addition, a communication system 50 is provided to transmit data to and from the vehicle seat 28. The communication system 50 includes a high frequency coded transmitter 52 connected to the primary winding 18 and a communication controller 54. The transmitted communication may be high frequency FM, PWM, FSK, or any other suitable communication signal that rides on or is carried by the low frequency energizing signal from the drive circuit 32. A receiving circuit 56 in the vehicle seat 28 is electrically connected to the secondary winding 20. The receiver 56 is connected to an appliance controller 58 in the seat 28 which, in turn, is connected to another controllable appliance or to a sensor 60, such as a weight or occupant position sensor. The communication system 50 can be used to monitor the sensor 60. The communication system 50 can also be used to provide electrical signals to devices such as a seat belt retractor pretensioner or a stereo speaker mounted in the vehicle seat 28. The electrical signals can contain specific code embedded within the signals which enables communication with two or more devices in the seat 28 independently.

From the above description of the invention, those skilled in the art to which the present invention relates will perceive improvements, changes and modifications. Such improvements, changes and modifications within the skill of the art to which the present invention relates are intended to be covered by the appended claims.

Having described the invention, the following is claimed:

1. An apparatus comprising:
    a vehicle seat mounted in a vehicle;
    an electrical appliance on said vehicle seat;
    transformer means for transmitting electrical energy to said vehicle seat, said transformer means including a first portion mounted to said vehicle and a second portion mounted to said vehicle seat, said second portion being electrically connected to said electrical appliance; and
    means for energizing said transformer means.

2. The apparatus of claim 1 wherein said first portion of said transformer means comprises a primary winding and said second portion of said transformer means comprises a secondary winding.

3. The apparatus of claim 2 wherein said means for energizing said transformer means includes a drive circuit electrically connected to said primary winding and having sensing means for sensing the presence of said secondary winding and switching off said means for energizing when said secondary winding is not sensed as being present.

4. The apparatus of claim 2 further including means for removably mounting said vehicle seat to said vehicle.

5. The apparatus as defined in claim 1 wherein said means for energizing said transformer means includes a drive circuit electrically connected to said first portion of said transformer means and having an oscillator.

6. The apparatus as defined in claim 1 wherein said second portion of said transformer means is connected to said electrical appliance through a rectifying circuit.

7. The apparatus of claim 6 further including a filter circuit connected between said rectifying circuit and said electrical appliance.

8. The apparatus of claim 1 further including a communication circuit operatively coupled to said transformer means for providing electrical communication with said electrical appliance for control of said appliance.

9. The apparatus of claim 2 wherein said primary winding provides electrical energy to said secondary winding without electrical leads connecting said primary and secondary windings.

\* \* \* \* \*